United States Patent
Koster

(10) Patent No.: US 6,259,914 B1
(45) Date of Patent: Jul. 10, 2001

(54) METHOD AND APPARATUS FOR IMPLEMENTING INTERNATIONAL WIRELESS ROAMING

(75) Inventor: Karl H. Koster, Atlanta, GA (US)

(73) Assignee: BellSouth Intellectual Property Corporation, Atlanta, GA (US)

( * ) Notice: Subject to any disclaimer, the term of this patent is extended or adjusted under 35 U.S.C. 154(b) by 0 days.

(21) Appl. No.: 09/130,565

(22) Filed: Aug. 7, 1998

(51) Int. Cl.$^7$ ........................................ H04Q 7/20
(52) U.S. Cl. .................. 455/432; 455/433; 455/435
(58) Field of Search ............................ 455/432, 433, 455/435, 434

(56) References Cited

U.S. PATENT DOCUMENTS

| | | | |
|---|---|---|---|
| 5,610,974 | * | 3/1997 | Lantto .................................. 455/433 |
| 5,699,408 | * | 12/1997 | Kropp et al. ......................... 375/59 |
| 5,712,900 | * | 1/1998 | Maupin et al. ....................... 455/433 |
| 5,734,700 | * | 3/1998 | Hauser et al. ........................ 455/413 |
| 5,819,178 | * | 10/1998 | Cropper ............................... 455/433 |
| 5,867,788 | * | 2/1999 | Joensuu ............................... 455/445 |
| 5,878,348 | * | 3/1999 | Foti ..................................... 455/434 |
| 5,915,220 | * | 6/1999 | Chelliah .............................. 455/435 |
| 5,943,619 | * | 8/1999 | Coyne et al. ........................ 455/433 |
| 5,978,678 | * | 11/1999 | Houde et al. ........................ 455/433 |
| 6,006,094 | * | 12/1999 | Lee ..................................... 455/445 |
| 6,011,975 | * | 1/2000 | Emery et al. ........................ 455/456 |
| 6,026,298 | * | 2/2000 | Lamb et al. ......................... 455/433 |
| 6,039,624 | * | 3/2000 | Holmes ............................... 455/403 |
| 6,097,950 | * | 8/2000 | Bertacchi ............................ 455/432 |

FOREIGN PATENT DOCUMENTS

| | | |
|---|---|---|
| 0 758 835 | 2/1997 | (EP) . |
| WO 98 02011 | 1/1998 | (WO) . |

* cited by examiner

Primary Examiner—Nguyen T. Vo
Assistant Examiner—Charles N. Appiah
(74) Attorney, Agent, or Firm—James L. Ewing, IV, Esq.; Nora M. Tocups, Esq.; Kirkpatrick Stockton LLP

(57) ABSTRACT

A method and apparatus for implementing international wireless roaming allows an international "roamer" to enter a visited system in a foreign country and originate calls. Upon entering the visited region, the roamer's mobile station initiates a registration request containing the mobile station's mobile identification number to the mobile switching center in the visited region. The mobile switching center initiates a message to an appropriate home location register. The home location register compares the mobile station's mobile identification number to a set of stored values. If an agreement is in place between the home location register provider and the roamer's home service provider, the home location register will return an appropriately formatted North American Numbering Plan mobile directory number to the mobile switching center. When the roamer initiates a call, the mobile switching center uses the mobile directory number in signaling call related information, specifically in populating parameters such as the Calling Pary Number. Recognizing a NANP-formatted number, the public switch telephone network will process the call as normal.

20 Claims, 5 Drawing Sheets

METHOD AND APPARATUS FOR IMPLEMENTING INTERNATIONAL WIRELESS ROAMING

BACKGROUND OF THE INVENTION

1. Field of the Invention

The present invention is directed to international wireless communication and, more particularly, to a method and apparatus for facilitating service to international roamers in a cellular system.

2. Background

Providing immediate access to home and work from remote locations, cellular telephones ("cell phones") have become increasingly popular. No longer prohibitively expensive, cell phones are used by a wide range of consumers. Presently, there are over 75 million cellular customers worldwide. Predictions show that over 300 million customers will be using cellular systems by the year 2,000. Cell phones and systems that are being introduced to the market have advanced features, services, and cost advantages over the older cellular technologies.

A cellular customer (a "subscriber") obtains cellular service within a region by subscribing to a wireless service provider ("WSP") that is licensed to provide service for that region. A single WSP uses many small radio coverage areas ("cells") to serve hundreds of square miles. The WSP relies upon a Mobile Switching Center ("MSC") to interconnect small radio coverage areas into a larger system as well as accepting and delivering calls to other networks, namely the public switched telephone network (PSTN). To maintain a call when the cell phone moves to another cell, the WSP switches the phone's radio channel frequency to another frequency available for use in an adjacent cell site. A frequency may be reused by more than one customer at a time in different cells without subscriber interference if they are far enough apart. WSPs take advantage of this by breaking the coverage area into many small cells. Adjacent cells use different frequencies to avoid interference, but widely separated cells may reuse the same frequencies. This allows the WSP to repeatedly reuse radio channels and increase the number of subscribers they can serve with a limited number of channel frequencies.

Each cell phone (or "mobile station") uses a unique signaling identifier when operating in a cellular system. This information is stored in its internal memory, called the Number Assignment Module ("NAM"). The NAM also contains a Mobile Identification Number ("MIN"), a home system identifier, access classification, and other information. The MIN value is usually the same value as the subscriber's mobile directory number ("MDN"), also known as the telephone number. The format of the telephone number for the United States, Canada, and various U.S. territories is based on the North American Numbering Plan ("NANP"). This plan defines a format based on a three digit Numbering Plan Area ("NPA"), a three digit central office code ("NXX"), and a four digit subscriber line number ("XXXXs"). (This is frequently denoted using a NPA-NXX-XXXX format where N=digits 2 through 9 and X=digits 0 through 9.) Since the MIN is the same value as the MDN, it is also implemented as a ten digit number that follows the NPA-NXX-XXXX format.

WSPs often allow customers from other cellular systems to use their service. The ability of a subscriber to use the service of a different WSP is termed "roaming". A common type of roaming is "automatic" roaming and is initiated by a process termed registration. Roamer registration occurs as follows: When a mobile station detects a foreign cellular system, it attempts to register with the system. This is accomplished by signaling, among other things, its MIN value and electronic serial number. The serving system searches for the wireless telephone's MIN in its visitor location register ("VLR") and determines that the wireless telephone is not yet registered. The visited cellular system uses the wireless telephone's MIN and ESN to request validation of the subscriber's identity from the subscriber's home cellular system, specifically the Home location register ("HLR"). The HLR will then determine if the subscriber is valid and acknowledge the status to the requesting cellular system. The visited VLR then temporarily stores the subscriber's registration information for future authorization eliminating the need to contact the subscriber's home HLR again if a call is processed. Once validated, the mobile station can receive and originate calls transparently. After a predetermined period of inactivity, the temporary authentication information stored in the VLR is erased.

The communication between the VLR and HLR frequently uses a signaling network known as Signaling System 7 ("SS7"). Each of the entities on this network, for example the VLR and HLR, is identified by a unique address called a point code. In many instances, a separate network entity called a signal transfer point ("STP") is used to derive the point code of the HLR based on tables associated with the MIN value. The VLR can send the registration request to the STP which then derives the appropriate HLR point code based on the MIN. The STP derives the address of the appropriate HLR based on the first six digits (corresponding to the NPA-NXX portion of the directory number).

During the period in which the mobile station is registered in the VLR, the mobile station may originate calls. During call origination, the MSC uses the stored MIN as the telephone number associated with the roamer. This value is used in populating certain SS7 is signaling parameters such as the "Calling Party Number" parameter.

While domestic automatic roaming is fairly common, international automatic roaming presents greater difficulties. Cellular subscribers from outside of the United States, Canada, and U.S. territories frequently do not enjoy the benefit of automatic roaming upon entering the country. Frequently, mobile subscribers cannot successfully register, which results in service being denied; or if they have successfully registered, toll calls may not successfully complete. Calls made to foreign countries (which are of particular interest to international roamers) are usually barred entirely. Accordingly, the utility of cellular service for an international roamer is drastically reduced. The problems associated with a mobile station registering are due to three problems: (1)The registration procedure necessary to establish a call often requires the existence of certain international business relationships; and (2) Various countries around the world have adopted different (and often incompatible) numbering plans; and (3) The frequent prohibition of international calls imposed upon subscribers by many U.S. cellular service providers.

The registration procedures require that the visited WSP have a direct or indirect business arrangement to provide service to the home service provider. While in the U.S. most cellular carriers have established roaming agreements directly with other carriers or utilize the service of clearinghouse to facilitate this, this is not often the case between international cellular service providers. Assuming that such roaming business arrangements are established, technical issues exist regarding the transfer of signaling information between the VLR and HLR. As previously described, this signaling information is carried by the SS7 network and requires that each entity be assigned an address known as a point code. Service providers outside the U.S., however, may not obtain point code addresses within the U.S. allocated numbering space. Rather, the signaling must be directed to an international gateway that can route such messages. Unfortunately, few, if any, international gateways have been established. This significantly limits the ability of a mobile station to automatically register.

Assuming that registration could successfully occur, the mobile station would then be authorized to initiate a call. Nevertheless, problems can occur with call establishment that hinders the utility of automatic roaming. One of these problems is traced to the differences between the telephone numbering plans of the U.S. and other countries which are not part of the NANP. When the mobile station originates a call, the MSC uses the stored MIN value as the calling party number to signal for call establishment to the PSTN. The local PSTN switch (or subsequent interexchange carrier switches) may examine the calling party number to ascertain the originating subscriber. Included in the examination is determining whether the NPA portion corresponds to a currently assigned area code as well as whether the NXX portion is properly formatted. If either of these portions corresponds to an invalid NPA-NXX-XXXX combination, the PSTN switch might deem the telephone number invalid. This might occur if the number is derived from the mobile station's MIN since it would be based on the numbering plan of the subscriber's country of origin. Many U.S. carriers would terminate processing of the call.

The final aspect that limits the utility of international roaming is the result of limitations imposed by many U.S. cellular service providers. Many such providers currently prohibit any international calls by any subscribers whether roaming or not, partly for concerns of losses due to fraud. It is anticipated that international roamers would frequently desire to phone their home country; prohibiting such calls obviously limits the utility of international roaming.

SUMMARY OF THE INVENTION

A preferred embodiment of the present invention overcomes the problems and disadvantages of the prior art by providing a domestic HLR that receives the registration request containing the MIN of the international roamer. The HLR maps this MIN to a mobile directory number which is then returned to the local serving switch during registration. The mobile directory number is a valid North American Numbering Plan-formatted number that is indirectly associated with the MIN of the international roamer. When the international roamer initiates a call, the serving switch uses the mobile directory number returned by the HLR as the calling party number. Since the number is NANP-formatted, any PSTN switch will properly consider the calling party number valid and, therefore, continue to process the call. To overcome the problem of completing international calls, the roamer may complete a domestic call that terminates on a system that can then allow the caller to complete an international toll call.

This is accomplished in part by mapping the international based MIN to a domestic HLR within the cellular telephone network. This is predicated on industry agreements that presume the first four digits of certain MIN values correspond to an international network identification code A signal transfer point uses the identification code within the MIN to route messages from the serving switch to the proper home location register. The HLR associates the international mobile station's MIN to a mobile directory number that it returns to the serving switch.

In accordance with the purpose of the invention, as embodied and broadly described herein, the invention is a method for facilitating cellular service in a visited service system from a cellular telephone storing a mobile identification number, the method comprising the steps of sending a registration notification from a serving switch to an HLR; sending an acknowledgement from the HLR to the serving switch, the acknowledgement including a mobile directory number associated with the mobile identification number; and, when the cellular telephone originates a telephone call, the serving switch using the mobile directory number as a calling party number for signaling purposes.

Objects and advantages of the invention will be set forth in part in the description that follows and in part will be obvious from the description or may be learned by practice of the invention. The objects and advantages of the invention will be realized and attained by means of the elements and combinations particularly pointed out in the appended claims.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
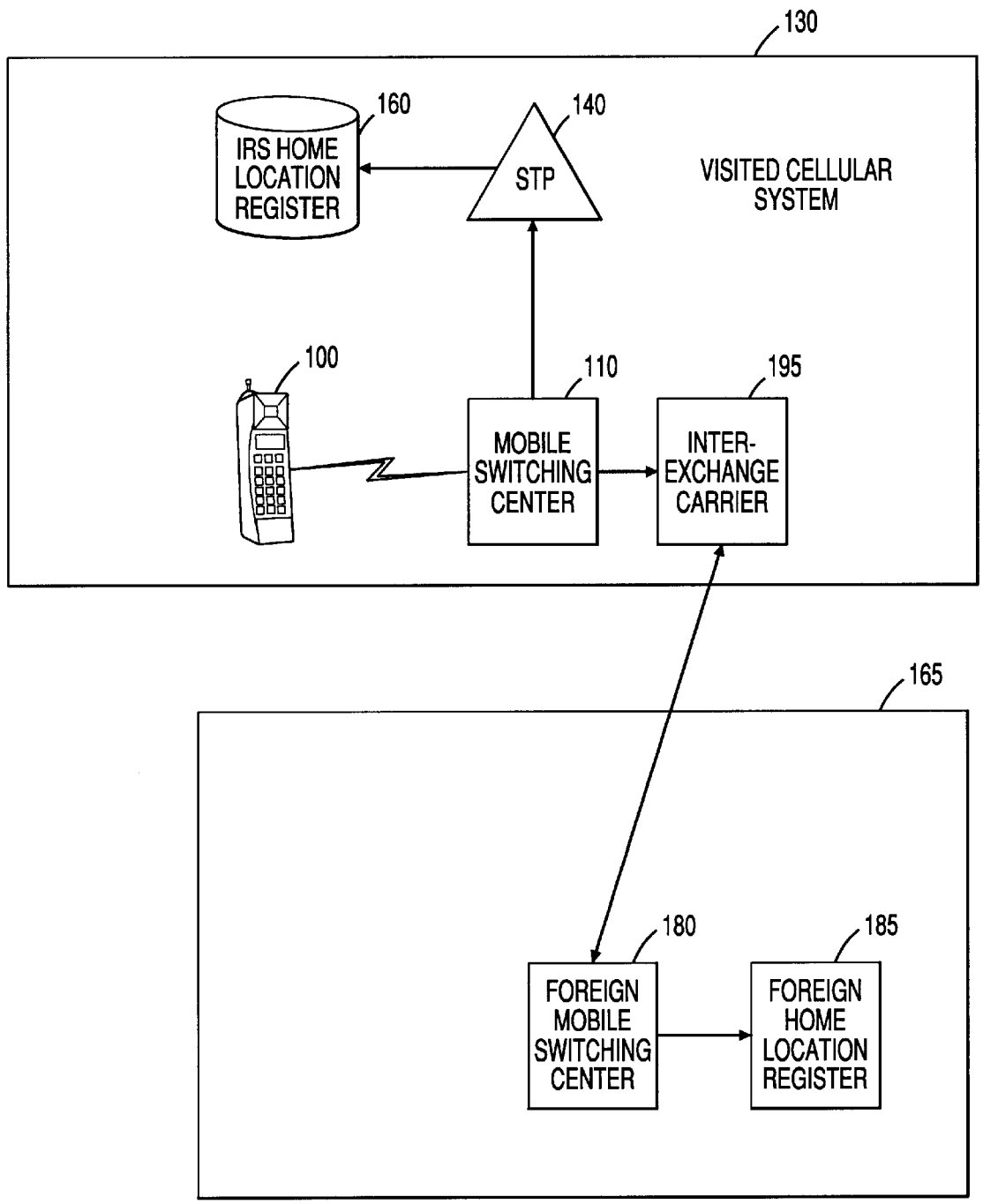
FIG. 1 is a block diagram of an international roaming network architecture, in accordance with a preferred embodiment of the present invention.

FIG. 1 is a block diagram of an international roaming network architecture, according to a preferred embodiment of the present invention. The architecture includes a foreign mobile station 100, such as a cellular or PCS telephone, operated by an international cellular telephone roamer. The roamer is pre-registered with a Home Service Provider ("HSP"), located in a service region 165 located outside of North America. The HSP controls a Foreign Mobile-service Switching Center 180 ("FMSC") that interconnects mobile equipment with the land telephone network of the foreign country. A Foreign Home Location Register 185 ("FHLR") is a subscriber database containing each customer's Mobile Identification Number ("MIN") and Electronic Serial Number ("ESN") to uniquely identify each customer, including the operator of foreign mobile station 100. FMSC 180 uses this information stored in FHLR 185 to authorize system access and process individual call billing. FHLR 185 may be a magnetic storage device for a computer.

Figure 2:
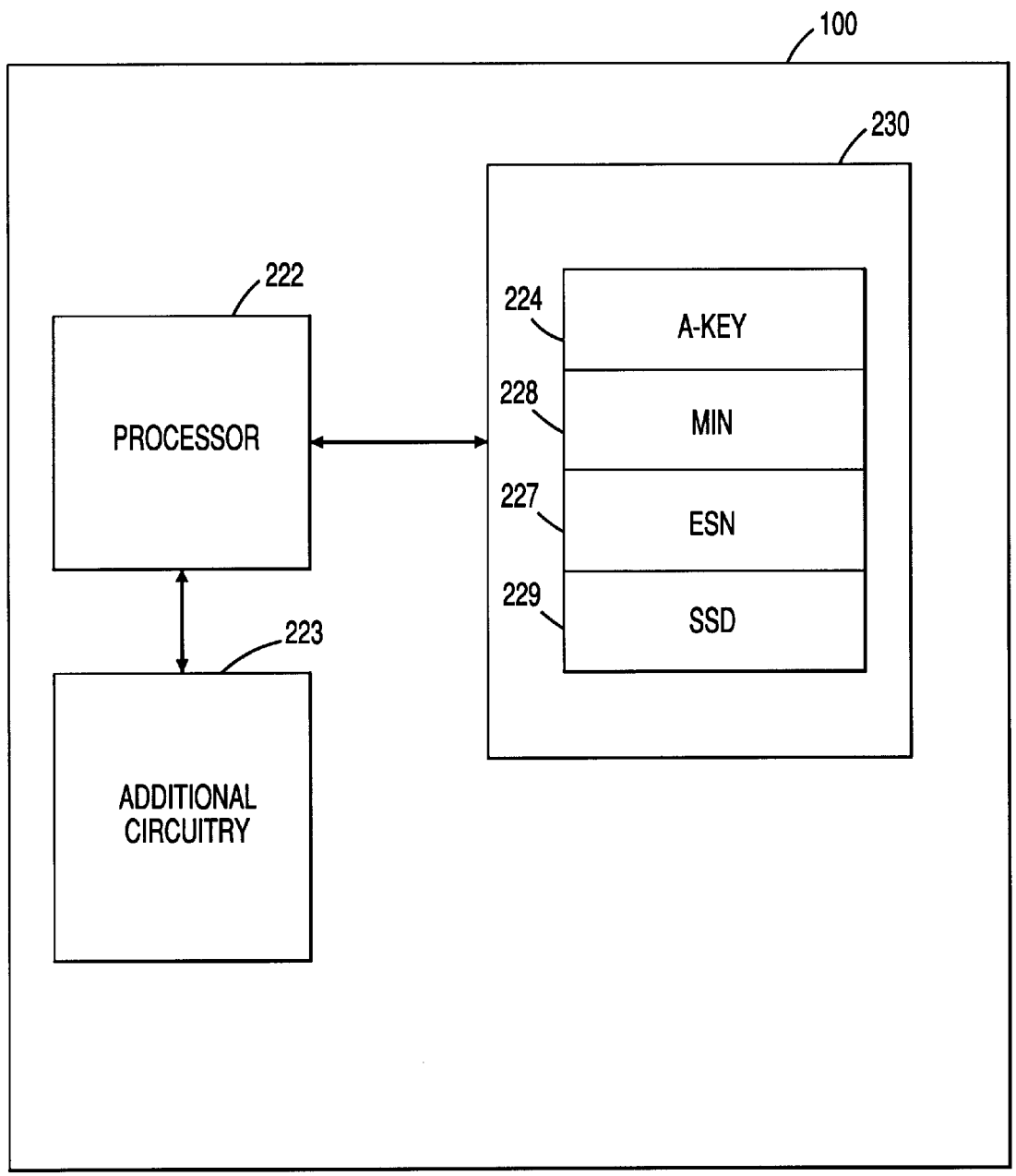
FIG. 2 is a block diagram of cellular telephone unit, in accordance with a preferred embodiment of the present invention.

FIG. 2 is a block diagram of foreign mobile station 100, in accordance with a preferred embodiment of the present invention. Foreign mobile station 100 includes processor 222 capable of processing messages received by foreign mobile station 100 using known hardware and according to known methods. To make each mobile station unique, several types of information is stored in its internal memory. This memory is called a Number Assignment Module ("NAM") 230. The NAM contains an authentication key or A-KEY 224, for authentication purposes, a Mobile Identification Number ("MIN") 228, which identifies the foreign mobile station 100, an Electronic Serial Number ("ESN") 227, which further identifies the foreign mobile station 100, and Super Secret Data ("SSD") 229, for encryption. The foreign mobile station 100 further includes additional circuitry 223 for transmitting and receiving data.

In FIG. 1, the "international roamer" is initiating an call from within a visited cellular system 130. A Wireless Service Provider ("WSP") provides cellular service within the visited cellular system 130. The WSP controls a Mobile Switching Center ("MSC" or "switch") 110 that interconnects mobile equipment with a North American land telephone network. In particular, MSC 110 is connected to an SS7 cellular telephone network, that may include one or more signal transfer points ("STP") 140, and International Roaming Service Home Location Register 160 ("IRS HLR"). MSC 110 creates SS7 messages and routes these messages via STP 140. STP 140 is responsible for routing traffic and is neither the originator of any traffic nor the final recipient of any traffic. SS7 signaling is described in detail in "Telecommunications Protocols," by Travis Russell, published in 1997 by The McGraw-Hill Companies, Inc., which is incorporated by reference herein.

The IRS HLR 160 functions as a home location register, but includes additional logic for performing international roaming, as described herein. In accordance with a roaming agreement between the WSP and the roamer's HSP, the WSP populates the IRS HLR 160 with the MIN 228 and ESN 227 of specified HSP subscribers, including the international roamer. Registration requests by the foreign mobile station 100 are routed to the correct IRS HLR 160 using a mapping of the first four digits of the MIN 228 to an SS7 point code for the IRS HLR 160. Pursuant to the International Forum on AMPS Standards Technology ("IFAST"), the first four digits of the MIN 228 correspond to an International Network Identification Code ("INIC"). The INIC is pre-pended to the national cellular number. The INIC is in the format of "0/1 XXX" where the first digit is either a "0" or a "1" and the three subsequent digits may be "0" through "9." Each INIC is mapped to an SS7 point code (address) for an IRS HLR. Thus, in the example illustrated in FIG. 1, the INIC for mobile station 100 would be mapped to a point code for IRS HLR 160.

Figure 3:
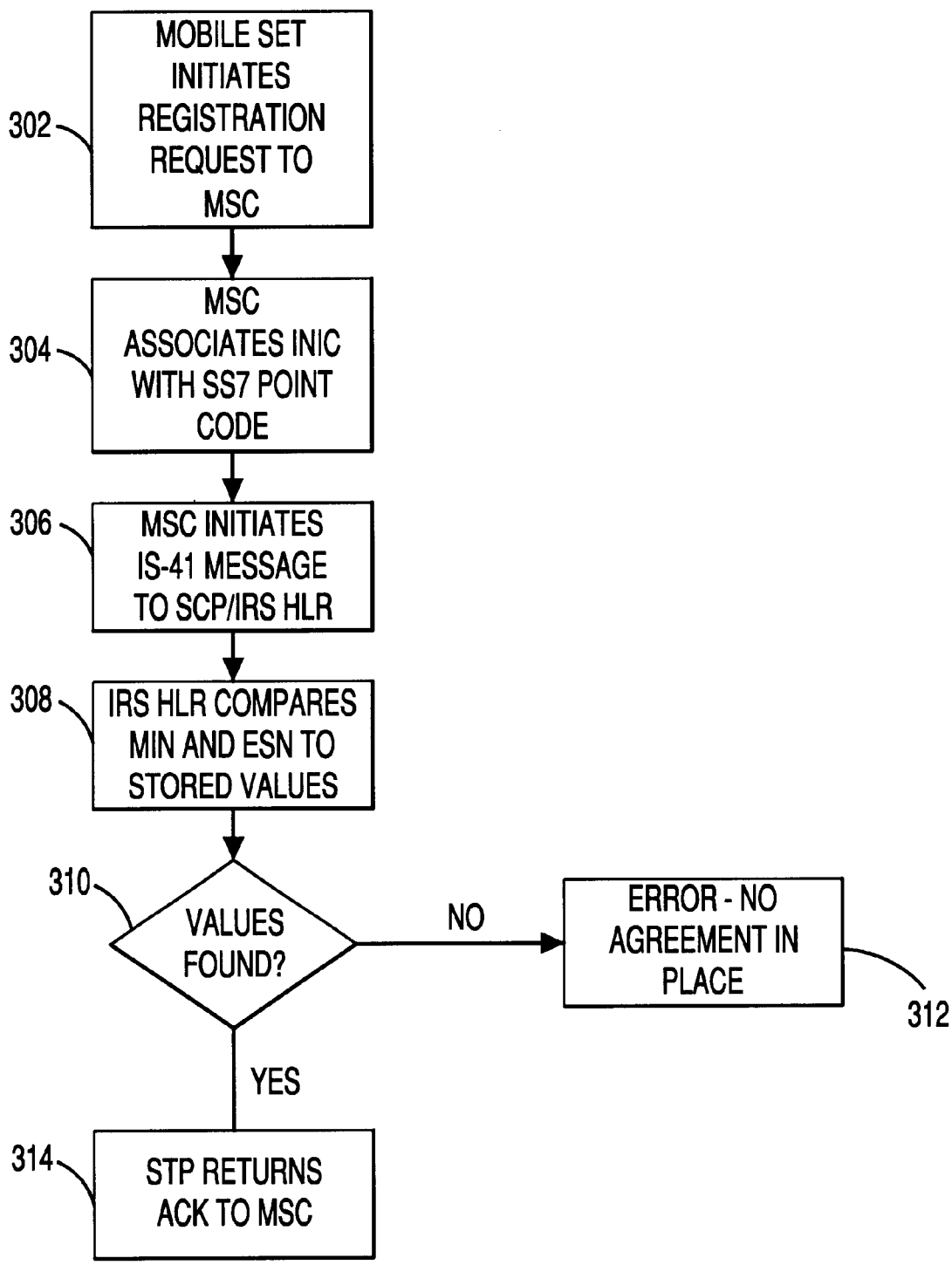
FIG. 3 is a flow chart illustrating steps performed within the network architecture of FIG. 1 during activation and registration of mobile station within a visited service region.

FIG. 3 is a flow chart illustrating steps performed within the network architecture of FIG. 1 during activation and registration of foreign mobile station 100 within a visited cellular system 130. In a first step 302, upon activation in a region serviced by WSP, foreign mobile station 100 initiates a registration request to MSC 110. The request includes the MIN (including the INIC) and ESN of foreign mobile station 100. In step 304, MSC 110 associates the INIC with an SS7 point code by the mapping described above. In step 306, MSC 110 initiates an IS-41 message, called the Registration Notification to the IRS HLR 160 using the SS7 network elements. IS-41 signaling is described in the Electronic Industry Association/Telecommunications Industry Association "Interim Standard-41, Revision C" which is incorporated by reference herein. The Registration Notification message, similarly contains the roamer's MIN and ESN.

In step 308, the IRS HLR 160 compares the MIN and the ESN to values stored in the IRS HLR 160. In step 310, if the values are found, the IRS HLR 160 confirms that the foreign mobile station 100 is a valid subscriber. In step 310, if the values are not found, the IRS HLR 160 will report an error in step 312. An error usually occurs when an agreement is not in place between the visited service provider and the roamer's home service provider. In step 314 the IRS HLR 160 returns an acknowledgment to the MSC 110. The acknowledgment includes a NANP-formatted Mobile Directory Number ("MDN") for the MIN. The IRS HLR 160 selects the MDN from a pool of numbers allocated to serve international roamers. The MDN is now associated with the original MIN. The MSC 110 will use the MDN to populate the calling party number parameter for any calls from the foreign mobile station 100 within the visited cellular system 120.

Figure 4:
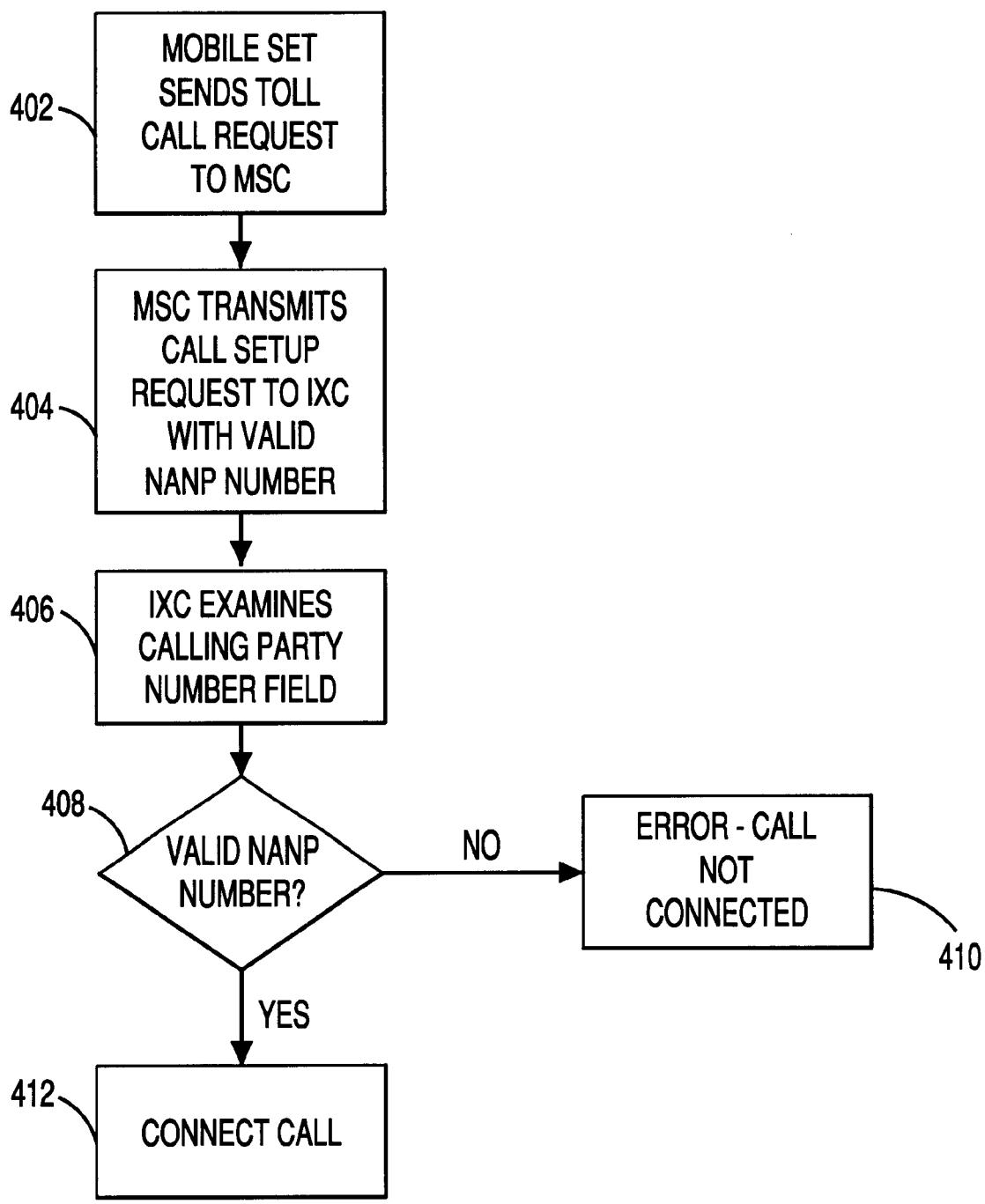
FIG. 4 is a flowchart illustrating steps performed during an international toll call from a mobile station.

FIG. 4 is a flowchart illustrating steps performed during a call from foreign mobile station 100. In step 402, foreign mobile station 100 originates a toll call by sending the toll call request to MSC 110. The request includes the desired destination telephone number. MSC 110, in step 404, uses the services of an interexchange carrier 195 ("IXC") (FIG. 1) to complete this call. The IXC is a land-line long distance carrier that includes switching equipment for switching calls to international switching centers. In particular, the MSC 110 transmits a Call Setup Request to IXC 195. The Call Setup Request is formatted according to the SS7 ISUP IAM standard.

Figure 5:
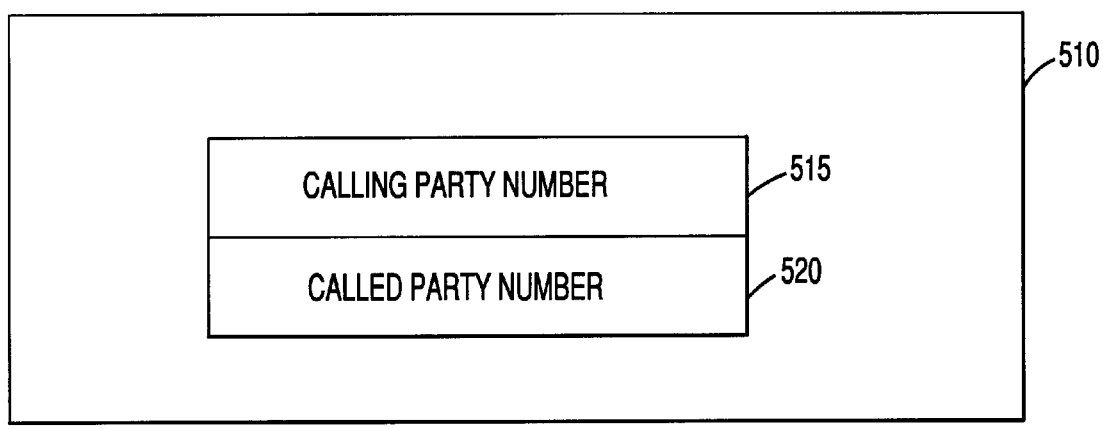
FIG. 5 is an illustration of a Call Setup Request, in accordance with a referred embodiment of the present invention.

FIG. 5 is an illustration of a Call Setup Request 510. The request 510 includes a Calling Party Number field 515 and a Called Party Number field 520. MSC 110 populates the Called Party Number field 520 with the destination number based on the dialed number. Rather than using the MIN of the mobile station 100 (which may or may not be a NANP-formatted number), MSC 110 populates the Calling Party number field 515 with the MDN previously returned during registration by the IRS HLR 160. The entire call establishment request 510 is then transmitted to IXC 195. IXC 195, in step 406, examines the calling Party Number field 515 of the request 510 and determine whether it includes a valid NANP-formatted number in step 408. Recognizing a NANP-formatted number, the IXC, in step 412, connects the call to the called party. If the NANP-formatted number were not provided in step 404, the IXC would report an error back to the MSC and the call would not be completed in step 410.

For the completion of international calls, this is accomplished by the mobile station establishing a domestic call that terminates on a system using the methods previously described, said system then allowing the caller to complete an international toll call.

Having thus described a preferred embodiment of a method and apparatus for international wireless roaming, it should be apparent to those skilled in the art that certain advantages have been achieved. It should also be appreciated that various modifications, adaptations, and alternative embodiments thereof may be made within the scope and spirit of the present invention. The invention is further defined by the following claims:

What is claimed is:

1. A method for facilitating mobile phone service within a visited cellular system to a foreign mobile station having a foreign mobile identification number, the method comprising:

transmitting the foreign mobile identification number from the foreign mobile station to the visited cellular system;

accessing an international roaming service home location register, where the international roaming service home location register is populated with a plurality of subscribed foreign mobile identification numbers and with a plurality of unassigned North American Numbering Plan-formatted (NANP) mobile directory numbers reserved for assignment to subscribed foreign mobile stations, to determine the foreign mobile station is a subscriber;

associating a North American Numbering Plan-formatted (NANP) mobile directory number with the foreign mobile identification number;

transmitting the NANP mobile directory number to a switch serving the foreign mobile station; and using the NANP mobile directory number within the switch when the foreign mobile station originates a call.

2. The method for facilitating a cellular telephone service, as recited in claim 1, wherein transmitting the foreign mobile identification number further comprises:

routing the foreign mobile identification number to the international roaming service home location register.

3. The method for facilitating cellular telephone service, as recited in claim 2, wherein the foreign mobile identification number is routed to the international roaming service home location register based on the first four digits of the foreign mobile identification number.

4. The method for facilitating cellular telephone service, as recited in claim 2, wherein the foreign mobile identification number is routed to the international roaming service home location register based on a plurality of digits in the foreign mobile identification number.

5. The method for facilitating cellular telephone service, as recited in claim 4, wherein the step of routing the foreign mobile identification number to the international roaming service home location register includes associating the plurality of digits with a Signaling System #7 point code of the international roaming service home location register.

6. The method for facilitating cellular telephone service, as recited in claim 2, wherein transmitting the foreign mobile identification number to the international roaming service home location register further comprises:

transmitting a registration request containing the foreign mobile identification number to the switch serving the foreign mobile station; and transmitting an IS-41 registration notification from the switch to the international roaming service home location register.

7. The method for facilitating cellular telephone service, as recited in claim 2, further comprising determining the foreign mobile station is a subscriber by comparing the foreign mobile identification number to the plurality of subscribed foreign mobile identification numbers to find a match.

8. The method for facilitating cellular telephone service, as recited in claim 2, wherein transmitting the NANP mobile directory number to the switch further comprises transmitting a call setup request containing the NANP mobile directory number to the switch.

9. The method for facilitating cellular telephone service, as recited in claim 8, wherein the NANP mobile directory number populates a calling party field of the call setup request.

10. A method for facilitating cellular telephone service within a visited cellular system from a foreign mobile station having a foreign mobile identification number, the method comprising:

transmitting a registration notification from a switch serving the foreign mobile station to an international roaming service home location register, where the international roaming service home location register is populated with a plurality of subscribed foreign mobile identification numbers and with a plurality of unassigned North American Numbering Plan-formatted (NANP) mobile directory numbers reserved for assignment to subscribed foreign mobile stations;

transmitting an acknowledgment from the international roaming service home location register to the switch, the acknowledgment including a North American Numbering Plan-formatted (NANP) mobile directory number associated with the foreign mobile identification number; and transmitting the NANP mobile directory number as a calling party number for the foreign mobile station when the foreign mobile station originates a telephone call.

11. The method for facilitating cellular telephone service, as recited in claim 10, comprising:

associating the foreign mobile identification number with an address of the international roaming service home location register; and routing the registration notification to the international roaming service home location register based on the foreign mobile identification number.

12. The method for facilitating cellular telephone service, as recited in claim 10, further comprising:

associating the first four digits of the foreign mobile identification number with an address of the international roaming service home location register within a network; and routing the registration notification to the international roaming service home location register based on the foreign mobile identification number.

13. The method for facilitating cellular telephone service, as recited in claim 10, wherein the mobile directory number is transmitted as a calling party number to a second switch.

14. The method for facilitating cellular telephone service, as received in claim 13, wherein the another switch is an interexchange carrier switch.

15. The method for facilitating cellular phone service, as recited in claim 14, wherein transmitting the NANP mobile directory number to the another switch further comprises transmitting a call setup request containing the NANP mobile directory number to the interexchange carrier.

16. A visited cellular system providing service to a foreign mobile station having a foreign mobile identification number and operating in an area of the visited cellular system, the system comprising:

a switch in the visited cellular system operative to receive the foreign mobile identification number (MIN) from the foreign mobile station, and to transmit the foreign MIN to an international roaming service home location register (IRS HLR);

the IRS HLR storing a plurality of subscribed foreign mobile identification numbers (MINs) and a plurality of unassigned North American Numbering Plan-formatted (NANP) mobile directory numbers reserved for assignment to subscribed foreign mobile stations, if the foreign MIN received by the switch in the visited cellular system is among the subscribed foreign MINs, for transmitting a North American Numbering Plan-formatted (NANP) mobile directory number associated with the foreign MIN to the switch in the visited cellular system; and the switch in the visited cellular system being further operative to receive the NANP mobile directory number from the IRS HLR and to use the NANP mobile directory number when the foreign mobile station originates a call in the visited cellular system.

17. The visited cellular system, as recited in claim 16, further comprising an interexchange carrier switch operative to receive information related to the foreign mobile station from the switch in the visited cellular system, the information including the NANP mobile directory number.

18. The visited cellular system, as recited in claim 16, wherein the switch in the visited cellular system transmits the foreign MIN in association with an IS-41 registration notification to the international roaming service home location register (IRS HLR).

19. The visited cellular system, as recited in claim 16, wherein the switch in the visited cellular system uses the NANP mobile directory number by populating a calling party field of a call setup request with the NANP mobile directory number.

20. A method for facilitating the provision of communications service to a foreign mobile station having a foreign mobile identification number (MIN) and operating in a visited system, comprising:

causing an international roaming service home location register to be populated with subscribed foreign mobile identification numbers (MINs) and with a plurality of unassigned North American Numbering Plan-formatted (NANP) mobile directory numbers reserved for assignment to subscribed foreign mobile stations;

causing the international roaming service home location register, in response to receipt of the foreign mobile identification number (MIN), to make a determination of correspondence between the foreign mobile identification number (MIN) and at least one of the subscribed foreign mobile identification numbers (MINs); and causing the international roaming service home location register, in response to the determination, to associate a mobile directory number (MDN) with the foreign MIN, and to transmit the MDN to a switch serving the foreign mobile station in the visited system, whereby the switch serving the foreign mobile station may use the MDN as a calling party number for the foreign mobile station when the foreign mobile station makes use of the communications service in the visited system.

* * * * *